United States Patent
Neubauer et al.

(10) Patent No.: US 8,117,027 B2
(45) Date of Patent: *__Feb. 14, 2012__

(54) METHOD AND APPARATUS FOR INTRODUCING INFORMATION INTO A DATA STREAM AND METHOD AND APPARATUS FOR ENCODING AN AUDIO SIGNAL

(75) Inventors: Christian Neubauer, Nuremberg (DE); Juergen Herre, Buckenhof (DE); Karlheinz Brandenburg, Erlangen (DE); Eric Allamanche, Nuremberg (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 378 days.

This patent is subject to a terminal disclaimer.

(21) Appl. No.: 12/238,365

(22) Filed: Sep. 25, 2008

(65) Prior Publication Data

US 2009/0076801 A1 Mar. 19, 2009

Related U.S. Application Data

(63) Continuation of application No. 10/089,950, filed as application No. PCT/EP00/09771 on Oct. 5, 2000, now Pat. No. 7,454,327.

(30) Foreign Application Priority Data

Oct. 5, 1999 (DE) .................................. 199 47 877

(51) Int. Cl.
*G10L 19/02* (2006.01)
*H04B 1/66* (2006.01)
*H04B 1/69* (2011.01)

(52) U.S. Cl. ..................... 704/200.1; 704/227; 704/230; 704/501; 375/146

(58) Field of Classification Search ............... 704/200.1, 704/226, 227, 229, 230, 500, 501; 375/146
See application file for complete search history.

(56) References Cited

U.S. PATENT DOCUMENTS 5,040,217 A * 8/1991 Brandenburg et al. .... 704/200.1
(Continued)

FOREIGN PATENT DOCUMENTS

DE 4102324 1/1991
(Continued)

OTHER PUBLICATIONS

"XOR Gate", Definition from Wikipedia, retrieved online Mar. 12, 2008 from url: http://en.wikipedia.org/wiki/XOR_gate; 3 pages.
(Continued)

*Primary Examiner* — Martin Lerner
(74) *Attorney, Agent, or Firm* — Glenn Patent Group; Michael A. Glenn

(57) ABSTRACT

Techniques for introducing information into a data stream first obtains the spectral values of the short-term spectrum of the audio signal. Separately, information to be introduced are combined with a spread sequence obtaining a spread information signal, whereupon a spectral representation of the spread information is generated, then weighted with an established psychoacoustic maskable noise energy to generate a weighted information signal, wherein energy of the introduced information is substantially equal to or below the psychoacoustic masking threshold. The weighted information signal and the spectral values of the short-term spectrum of the audio signal are then summed and afterwards processed again to obtain a processed data stream including audio information and information to be introduced. Because the information to be introduced are introduced without changing to the time domain, the block rastering underlying the short-term spectrum are not touched, thus introducing a watermark will not lead to tandem encoding effects.

9 Claims, 3 Drawing Sheets

U.S. PATENT DOCUMENTS

| | | | |
|---|---|---|---|
| 5,285,498 A | | 2/1994 | Johnston |
| 5,301,363 A | | 4/1994 | Hinderks |
| 5,311,561 A | * | 5/1994 | Akagiri ........................ 375/240 |
| 5,319,735 A | | 6/1994 | Preuss et al. |
| 5,404,377 A | | 4/1995 | Moses |
| 5,553,193 A | | 9/1996 | Akagiri |
| 5,623,577 A | | 4/1997 | Fielder |
| 5,687,191 A | * | 11/1997 | Lee et al. ................... 704/200.1 |
| 5,812,672 A | | 9/1998 | Herre et al. |
| 5,812,971 A | | 9/1998 | Herre et al. |
| 5,848,155 A | | 12/1998 | Cox |
| 5,930,369 A | | 7/1999 | Cox et al. |
| 5,960,398 A | | 9/1999 | Fuchigami et al. |
| 5,991,715 A | | 11/1999 | Wiese |
| 6,035,177 A | | 3/2000 | Moses et al. |
| 6,061,793 A | | 5/2000 | Tewfik et al. |
| 6,104,996 A | | 8/2000 | Yin |
| 6,108,625 A | * | 8/2000 | Kim ............................ 704/229 |
| 6,122,618 A | | 9/2000 | Park |
| 6,246,345 B1 | * | 6/2001 | Davidson et al. ............... 341/51 |
| 6,300,888 B1 | | 10/2001 | Chen et al. |
| 6,301,555 B2 | | 10/2001 | Hinderks |
| 6,308,150 B1 | * | 10/2001 | Neo et al. ................... 704/200.1 |
| 6,320,965 B1 | | 11/2001 | Lavine |
| 6,363,338 B1 | * | 3/2002 | Ubale et al. ................ 704/200.1 |
| 6,466,912 B1 | | 10/2002 | Johnston |
| 6,499,010 B1 | * | 12/2002 | Faller ........................... 704/229 |
| 6,526,385 B1 | | 2/2003 | Kobayashi et al. |
| 6,584,138 B1 | * | 6/2003 | Neubauer et al. ............. 375/130 |
| 6,725,192 B1 | | 4/2004 | Araki |
| 7,346,514 B2 | * | 3/2008 | Herre et al. ................... 704/273 |
| 7,454,327 B1 | * | 11/2008 | Neubauer et al. .......... 704/200.1 |
| 7,676,336 B2 | * | 3/2010 | Herre et al. ...................... 702/77 |
| 7,886,152 B2 | * | 2/2011 | Neubauer et al. ............. 713/176 |
| 7,917,763 B2 | * | 3/2011 | Kulessa et al. ............... 713/176 |
| 2004/0162720 A1 | * | 8/2004 | Jang et al. ................... 704/200.1 |
| 2007/0100610 A1 | * | 5/2007 | Disch et al. ................... 704/212 |
| 2009/0138259 A1 | * | 5/2009 | Neubauer et al. .......... 704/200.1 |

FOREIGN PATENT DOCUMENTS

| | | |
|---|---|---|
| DE | 4430864 | 8/1994 |
| DE | 19640825 | 9/1997 |
| EP | 0446037 A2 | 9/1991 |
| EP | 540330 | 5/1993 |
| WO | WO97/33391 | 9/1997 |
| WO | WO98/27504 | 6/1998 |

OTHER PUBLICATIONS

W.R Th. Ten Kate et al, Digital Audio Carrying Extra Information, Proceedings of the IEEE International Conference on Acoustics, Speech and Signal Processing, Albuquerque, NM, vol. 2, Apr. 1990, pp. 1097-1100.

Johnston, J.D., "Transform coding of audio signals using perceptual noise criteria", IEEE Jour, Selected Areas in Commun., vol. 6, No. 2, Feb. 1988, pp. 314-323.

* cited by examiner

METHOD AND APPARATUS FOR INTRODUCING INFORMATION INTO A DATA STREAM AND METHOD AND APPARATUS FOR ENCODING AN AUDIO SIGNAL

CROSS REFERENCE TO RELATED APPLICATIONS

This patent application is a continuation of U.S. patent application Ser. No. 10/089,950, filed Aug. 7, 2002, claiming domestic priority of PCT/EP00/09771, filed Oct. 5, 2000 and foreign application of Germany 19947877.5, filed Oct. 5, 1999, all of which are incorporated herein in their entirety by this reference thereto.

FIELD OF THE INVENTION

The present invention relates, in general, to audio signals and, in particular, to introducing information into a data stream having spectral values that represent a short-term spectrum of an audio signal. Especially in the field of copyright protection for audio signals, the present invention serves to introduce copyright information, for example, into an audio signal as inaudible as possible.

BACKGROUND OF THE INVENTION AND PRIOR ART

With the increasing distribution of the Internet, music piracy has also drastically increased. At many locations on the Internet, of music or, in general, audio signals can be downloaded. Copyrights are only considered in very few cases. Particularly, the authorisation of the author is very rarely obtained as to whether he wants to offer his work or not. Fees occurring are rarely paid to the author for lawful copying. Apart from that, an uncontrolled copying of works takes place which, in most cases, also happens without consideration of copyrights.

When music is lawfully purchased from a provider of music via the Internet, the provider usually produces a header in which copyright information as well as, for example, a customer ID are introduced, the customer ID uniquely referring to the present purchaser. It is further known to introduce copy allowance information into that header, which signal the diverse types of copyrights, for example, that the copying of the current piece is completely forbidden, that the copying of the current piece is only allowed once, that the copying of the current piece is totally free, etc.

The customer has a decoder that reads in the header, and that, in compliance with the allowed actions, for example, only allows one copy and refuses further copies.

This concept for consideration of copyrights, however, only works for customers who behave legally.

Illegal customers usually have a significant potential of creativity to "crack" pieces of music that are provided with a header. The disadvantage of the described procedure for the protection of copyrights is shown here. Such a header can be removed easily. Alternatively, an illegal user could also modify individual entries in the header, for example, to change the entry "copying forbidden" to an entry "copying totally free". It is also a possible case that an illegal customer removes his own customer ID from the header and then offers the piece of music on his or another Homepage in the Internet. From that moment onwards, it is no longer possible to identify the illegal customer, since he has removed his customer ID. Attempts to prevent such violations of the copyright will, therefore, inevitably be useless, since the copy information has been removed from the piece of music or has been modified and, since the illegal customer who has done that, cannot be identified anymore to call him to account. If, instead, a secure introduction of information into the audio signal were existent, then government authorities who prosecute copyright violations could trace suspicious pieces of music in the Internet and, for example, could establish the user identification of such illegal pieces in order to put a stop to the illegal users.

From WO 97/33391, an encoding method for introducing an inaudible data signal into an audio signal is known. There, the audio signal into which the inaudible data signal is to be introduced is converted into the frequency area in order to determine the masking threshold of the audio signal using a psychoacoustic model. The data signal to be introduced into the audio signal is multiplied with a pseudo noise signal in order to create a frequency-spread data signal. The frequency-spread data signal is then weighted with a psychoacoustic masking threshold, such that the energy of the frequency-spread data signal will always be below the masking threshold. Finally, the weighted data signal is superimposed on the audio signal, whereby an audio signal is created in which the data signal is inaudibly introduced. On the one hand, the data signal can be used to establish the range of a transmitter. On the other hand, the data signal can be used for the identification of audio signals in order to easily identify possible pirate copies, since every sound carrier, for example, a compact disc, is provided with an individual identification ex works. Further described possibilities for the application of the data signal is the remote control of audio devices, analogous to the "VPS" method on television.

This method is highly secured against music pirates, since; on the one hand, they are probably not aware that the piece of music that they are copying is identified. Apart from that, it is almost impossible to extract the data signal, which is inaudibly present in the audio signal without an authorised decoder.

Audio signals are 16 bit PCM samples, when they come from a compact disc. A music pirate could, for example, manipulate the sampling rate or the levels or phases of samples to make the data signal unreadable, i.e., undecodable, whereby the copyright information would also be removed from the audio signal. This, however, will not be possible without significant quality losses. Data that are introduced into audio signals in such a way can therefore, analogous to bank notes, also be referred to as "watermarks".

The method described in WO 97/33391 for introducing an inaudible data signal into an audio signal works by using the audio samples that are present as time domain samples. Thereby, it is necessary that audio pieces, i.e., pieces of music, radio plays, etc., have to be present as a sequence of timely samples in order to be provided with a watermark. This has the disadvantage that this method cannot be used for already-compressed data streams that have been processed, for example, according to one of the MPEG methods. This means that a provider of pieces of music who wants to provide the pieces of music with a watermark prior to shipment to the customer has to store the pieces of music as a sequence of PCM samples. This leads to the provider for music needing to have a very high storage capacity. However, it would be desirable to use the very-effective audio compressing method already for storing the audio data at the provider.

A provider for audio data of the above-described type could, of course, simply compress all pieces of music, for example, by using the standards MPEG-2 AAC 13818-7 and then decompress them fully again before the audio piece is to be provided with a watermark, in order to have a sequence of audio samples again that will then be fed into a known apparatus for introducing an inaudible data signal in order to introduce a watermark. This needs a significant effort in that prior to the introduction of information into the audio signal, a full decompression or decoding is necessary. Such a decoding costs time and money. However, a much more serious feature is the fact that in such a procedure, tandem encoding effects occur.

A further disadvantage of this procedure is that due to the fact that the watermark is introduced into the PCM data, there is no security as to whether the watermark is still present after an audio compression. When PCM data provided with watermarks and having a relatively low bit rate and are encoded, the encoder introduces a lot of quantizing noise when quantizing due to the relatively low bit rate, which will, in an extreme case, lead to the fact that no watermark can be decoded anymore. It is also problematic that with this procedure, the bit rate of the audio encoder that encodes the PCM data provided with watermarks is not known previously and that is why no secure control of the ratio between watermark energy and noise energy due to the quantizing noise is possible.

It is known that audio encoding methods according to one of the MPEG standards are no loss-less encoding methods, but lossy encoding methods. Bit savings in comparison to direct transmission of audio samples in the time domain are achieved, to a large part, by making use of psychoacoustic masking effects. Particularly, for a block of, for example, 2048 audio samples, the psychoacoustic masking threshold will be established as a function of frequency, whereupon, after a time frequency transformation of the audio samples the quantizing of spectral values including the short-term spectrum will be carried out under consideration of this psychoacoustic masking threshold. In other words, the quantizer step size is controlled, such that the noise energy introduced by quantizing is smaller or equal to the psychoacoustic masking threshold. In areas of the audio signal where the masking index, i.e., the ratio of audio signal energy to the psychoacoustic masking threshold is very small, like, for example, in very noisy areas of the audio signal, the spectral values need to be only roughly quantized, without audible interferences occurring after a sub-sequent decoding. In other areas where the audio signal is very tonal, it has to be quantized more finely, such that relatively small noise energy results due to the quantizing, since the masking index is very large.

It becomes clear from the above that due to the quantizing procedure, information of the original audio signal gets lost. This does not matter when the quantized audio signal is decoded again, since the noise energy due to the quantizing has been distributed in such a way that it remains below the psychoacoustic masking threshold and will, therefore, be inaudible when an ideal psychoacoustic model has been used. These considerations, however, always only apply for a certain short-term spectrum or for a block of, for example, 2048 subsequent audio values, respectively. After the decoding, the block of audio samples does, however, comprise no more information about how the block building was performed. When the known apparatus for introducing information has been used which, in most cases, has a certain delay compared to an audio encoder that does not introduce information, it can therefore not be assumed that the same block partitioning takes place accidentally. Instead, the block partitioning, the short-term spectrum creation and the quantizing will take place in a totally different block raster. A renewed decoding will then usually lead to clearly audible interferences, since it does not refer to the same short-term spectrum, but to different short-term spectrums. This appearance of audible interferences through two encoding/decoding stages due to their different partitioning of the stream of audio samples into blocks is referred to as tandem encoding effect.

It should be noted that in general by introducing the inaudible data signal, noise energy is introduced into the audio signal, which already includes noise energy due to the uninfinitely fine quantizing procedure. Introducing the inaudible data signal therefore has a tendency to lead to a deterioration of the audio quality unless special precautions will be taken. In this connection, a further introduction of noise energy due to the tandem encoding effects previously described is therefore even less desirable, since this quality loss appears systematically without any benefit, while small quality deteriorations due to the watermarks are more acceptable, since the watermark also has an advantage. Tandem encoding effects, however, only cause interferences, but have no advantage at all.

U.S. Pat. No. 5,687,191 discloses a concept for transmitting hidden data after data compression. An audio signal is transferred into sub-band samples via a sub-band encoder, wherein each sub-band filter generates a sequence of timely samples whose spectral bandwidth is the same as the bandwidth of the respective sub-band filter. A data stream with such quantized sub-band samples will be unpacked and demultiplexed in order to perform an inverse quantizing, such that sub-band samples will be present again. Further, a pseudo noise spread sequence is filtered by a sub-band filter bank to obtain a sequence of timely sub-band samples for every filter of the sub-band filter bank having a bandwidth determined by the respective sub-band filter. The data to be transported will be subjected to a forward error correction and a performance control securing that the auxiliary data signal is below the noise quantizing floor of the audio sub-band samples. The so processed auxiliary data values will then be connected with respective sub-band values of the pseudo noise spread sequence via respective modulators and then XORed with the unpacked sub-band values of the audio signal. The so obtained combined sub-band values will then be quantized again and packed, in order to obtain an output data stream.

SUMMARY OF THE INVENTION

It is the object of the present invention to provide a concept that makes it possible to provide audio pieces with a watermark, while the effects of the watermark to the audio quality should be as low as possible.

In accordance with a first aspect of the invention, this object is achieved by a method for introducing information into a data stream including data about spectral values representing a short-term spectrum of an audio signal, including: processing the data stream to obtain the spectral values of the short-term spectrum of the audio signal; combining the information with a spread sequence to obtain a spread information signal; generating a spectral representation of the spread information signal to obtain a spectral spread information signal; establishing psychoacoustic maskable noise energy as function of frequency for the short-term spectrum of the audio signal, wherein the psychoacoustic maskable noise energy is smaller or the same as the psychoacoustic masking threshold of the short-term spectrum; weighting the spectral spread information signal by using the established noise energy to generate a weighted information signal, wherein the energy of the introduced information is substantially equal to or below the psychoacoustic masking threshold; summing the weighted information signal with the spectral values of the short-term spectrum of the audio signal to obtain sum spectral values including the short-term spectrum of the audio signal and the information; and processing the sum spectral values to obtain a processed data stream including the data about the spectral values of the short-term spectrum of the audio signal and the information to be introduced.

In accordance with a second aspect of the invention, this object is achieved by a method for generating a short-term spectrum of the audio signal including a plurality of spectral values, comprising; computing the psychoacoustic masking threshold of the audio signal using a psychoacoustic model; quantizing the spectral values considering the psychoacoustic masking threshold so that the noise energy introduced by quantizing is smaller than the psychoacoustic masking threshold by a predetermined amount; forming a bit stream including values corresponding to the quantized spectral values of the short-term spectrum.

In accordance with a third aspect of the invention, this object is achieved by a Apparatus for introducing information into a data stream including data about spectral values representing a short-term spectrum of an audio signal, including: a processor for processing the data stream to obtain the spectral values of the short-term spectrum of the audio signal; a combiner for combining the information with a spread sequence to obtain a spread information signal; a generator for generating a spectral representation of the spread information signal to obtain a spectral spread information signal; an establisher for establishing psychoacoustic maskable noise energy as function of the frequency for the short-term spectrum of the audio signal, wherein the psychoacoustic maskable noise energy is smaller than or equal to the psychoacoustic masking threshold of the short-term spectrum; a weighter for weighting the spectral spread information signal by using the established noise energy to generate a weighted information signal, wherein the energy of the introduced information is substantially equal to or below the psychoacoustic masking threshold; a summer for summing the weighted information signal with the spectral values of the short-term spectrum of the audio signal to obtain spectral values including the short-term spectrum of the audio signal and the information; and another processor for processing the sum spectral values to obtain a processed data stream including the data about the spectral values of the short-term spectrum of the audio signal and the information to be introduced In accordance with a fourth aspect of the invention, this object is achieved by a Apparatus for encoding an audio signal, including: a generator for generating a short-term spectrum of the audio signal including a plurality of spectral values; a calculator for computing a psychoacoustic masking threshold of the audio signal using a psychoacoustic model; a quantizer for quantizing spectral values considering the psychoacoustic masking threshold so that the noise energy introduced by quantizing is smaller than the psychoacoustic masking threshold by a predetermined amount; a bitstream formatter for forming a bit stream including values corresponding to the quantized spectral values of the short-term spectrum.

The present invention is based on the knowledge that it has to be given up to carry out a complete decoding before inserting the watermark. Instead, a data stream including spectral values representing a short-term spectrum of an audio signal will therefore inventively only be partly "unpacked" until the spectral values are present. The unpacking is, however, not a complete decoding, but only a partly decoding where all the information about the block forming or the block raster used in the original encoder, respectively, is not touched.

This is achieved by carrying out the inventive method with spectral values and not with timely samples. The information, which is to be introduced into the audio signal, will be combined with a spread sequence in the sense of a spread spectrum modulation in order to obtain a spread information signal. Afterwards, a spectral representation of the spread information signal will be generated, for example, by a filter bank, a FFT, a MDCT or similar, in order to obtain a spectral spread information signal. Now, a psychoacoustic maskable interference will be established as a function of frequency for the short-term spectrum of the audio signal to then weighten the spectral spread information signal by using the established noise energy, so that a weighted information signal can be generated, the energy of which is substantially equal or below the psychoacoustic masking threshold. After that, the weighted information signal will be added to the spectral values of the short-term spectrum of the audio signal in order to obtain sum spectral values including the short-term spectrum of the audio signals and, additionally, the introduced information. Finally, the sum spectral values will be processed again in order to obtain a processed data stream including the data about the spectral values of the short-term spectrum of the audio signal and the information, which has to be introduced. In the case of a MPEG-AAC encoder, the processing of the sum spectral values will, again, include the quantizing and entropy encoding, for example, by using a Huffman code.

It is to be noted that, thereby, the block rastering provided by the original encoder, which produces the data stream, will not be touched. Thereby, no tandem effects will occur, that would lead to a loss of audio quality. Apart from that, it is preferred that with the processing happening after the weighting that comprises quantizing, the same quantizing step size(s) as in the original bit stream s/are used, which has the advantage that the very computing intensive iteration loops of the quantizer do not need to be computed again. Further, no tandem encoding effects occur that would otherwise be unavoidable, since in the case of a renewed computing, more or less strongly differing quantizing step sizes could occur.

The inventive introduction of a watermark directly into a data stream enables, for example, the introduction of a customer ID during the delivery of the music to a customer, since the procedure can be executed on modern personal computers in multiple real time since, among others, the expensive frequency time transformation is not needed, which would be needed with a complete decoding.

A further advantage of the present invention is that the music provider does not have to store the PCM samples, but can store pre-encoded data streams which can offer a factor in the order of 12 in storage place and that the provider can still introduce customer specific watermarks without the occurrence of additional tandem encoding effects which would lead to an audio quality loss.

The inventive procedure can easily be implemented, since only an additional time/frequency transformation of the spread information signal is necessary. A further significant advantage is that the inventive method has a good interoperability, i.e., that standard data streams can be processed and that for watermarks according to the known methods and for watermarks according to the inventive method, the same watermark decoder can be used. Finally, it is a further advantage that an audio encoder cannot erase the watermark anymore, since an exact control of the ratio between quantizing noise and watermark energy exists.

It is to be noted that it is, of course, possible to remove the watermark illegally when the data stream provided with the watermark is decoded and then encoded again, but only with a low bit rate. In this case, the noise energy introduced by the quantizer will exceed the watermark energy, so that no watermark can be extracted from the audio signal anymore. This is not a problem however, since the audio quality of the audio signal has decreased so strongly due to the high quantizing noise that such a poor audio signal does not have to be protected any longer. If the watermark in an audio signal is destroyed, then its quality is also destroyed.

The psychoacoustic maskable noise energy can be established in different ways. The first option is to use a psychoacoustic model for establishing the psychoacoustic maskable interference energy, which generates the psychoacoustic masking threshold as a function of a frequency from the short-term spectrum. A plurality of psychoacoustic models exists, those psychoacoustic models which work with spectral values of the short-term spectrum anyway are especially advantageous, since these spectral values are directly present due to the partly un-packing of the data stream. However, other psychoacoustic models can be used alternatively, which are developed for time domain data wherein, here, in contrary to the above-described option, a frequency time transformation would be necessary. Although the possibility of calculating a psychoacoustic model in order to obtain the psychoacoustic masking threshold of the short-term spectrum is relatively computing time-extensive, this possibility does, however, offer the decisive advantage that no tandem encoding effects will be generated, since the block rastering will not be touched.

Another more favourable option concerning the computing time effort for establishing the psychoacoustic maskable noise energy is to generate the data stream in such a way that it comprises apart from the spectral values and the usual side information, also the psychoacoustic masking threshold as a function of a frequency for every short-term spectrum. Establishing the psychoacoustic maskable noise energy then functions simply by extracting the psychoacoustic masking threshold transmitted in the data stream. With this possibility and the possibility described above where the psychoacoustic masking model is computed, the psychoacoustic maskable noise energy is the psychoacoustic masking threshold itself. The disadvantage of the method for transmitting the psychoacoustic masking threshold in the data stream is the fact that a special audio encoder is needed, since the psychoacoustic masking threshold is not transmitted with common audio encoding, but only the spectral values and the respective scale factors. In closed systems, however, compatibility to standard data streams is not required. Therefore, this option can be implemented here with little effort and favourable computing time.

It is another possibility to provide a special audio encoder whose quantizer always functions in such a way that the quantizing noise is lower than the psychoacoustic masking threshold by a predetermined amount. This means that the encoder is designed so that its quantizer quantizes a bit finer than he would usually have to, such that additional noise energy can be added without any noise being audible. This additional noise energy can then be "used up" with the introducing of information into the data stream in order to introduce the information. In the case of an optimum psychoacoustic model, this possibility leads to a data stream with an introduced watermark that has suffered no quality deterioration at all. The disadvantage of this method is, like with the direct transmission of the psychoacoustic masking threshold, the fact that this method is not compatible with common encoders.

Another possibility for establishing the psychoacoustic maskable noise energy is to establish the noise energy that has, in fact, been introduced by the quantizing of the encoder which has generated the data stream and to derive the information obtained in weighting. This option assumes that the encoder has quantized such that the noise energy was below the psychoacoustic masking threshold or only slightly above it. This method can use the standard bit streams like the method described as the first possibility, since only the spectral values and the scale factors that are both present in the data stream are needed in order to obtain the psychoacoustic maskable noise energy. From the scale factors, the step size of the quantizer associated to the respective scale factor can be established in order to compute the noise energy introduced into a scale factor band that is typically equal to the psychoacoustic masking threshold or below that. The psychoacoustic maskable noise energy for the introduced information used in weighting can be the same as the quantizing noise energy, but it can also have a factor between greater than zero and smaller than one, wherein the factor closer to zero leads to less audible interferences due to the watermark, but could be more problematic in extracting than a factor closer to one.

BRIEF DESCRIPTION OF THE DRAWINGS

Preferred embodiments of the present invention will be discussed in detail below with reference to the accompanying drawings. They show.

DETAILED DESCRIPTION OF PREFERRED EMBODIMENTS

Before the individual Figs. will be referred to in more detail, the system theoretical background of the present invention will be briefly discussed. In general, the introduction of information into the audio signal should not lead to an audible quality deterioration of the audio signal, or only to a barely audible one. In order to ascertain as to how much energy the signal representing the information to be introduced may have, the masking threshold of the audio signal is continuously computed by using a psychoacoustic model. The frequency-selective computing of the masking threshold by using, for example, the critical bands as well as a plurality of further psychoacoustic models is known in the art. As an example, it is referred to the standard MPEG2-AAC (ISO/IEC 13818-7).

The psychoacoustic model leads to a masking threshold for a short-term spectrum of the audio signal. Usually, the masking threshold will vary across the frequency. As a matter of definition, it is assumed that a signal introduced into the audio signal will then be inaudible when the energy of this signal is below the masking threshold. The masking threshold strongly depends on the composition of the audio signal. Noisy signals have a higher masking threshold than very tonal signals. The energy of the signal that is introduced into the audio signal therefore strongly varies across the time. Usually, for decoding the information introduced into an audio signal, a certain signal/noise ratio is needed. Thereby, it can happen that with very tonal audio signal portions, the energy of the additionally introduced signal will become so low that the signal/noise ratio will no longer be sufficient for secure decoding. In such areas, a decoder cannot, therefore, correctly decode the individual bits anymore. From a system theoretical point of view, the introduction of information into an audio signal in dependence of the psychoacoustic masking thresholds can therefore be seen as the transmitting of a data signal via a channel with strongly varying noise energy, wherein the audio signal, i.e., the music signal is seen as an interference signal.

Figure 1:
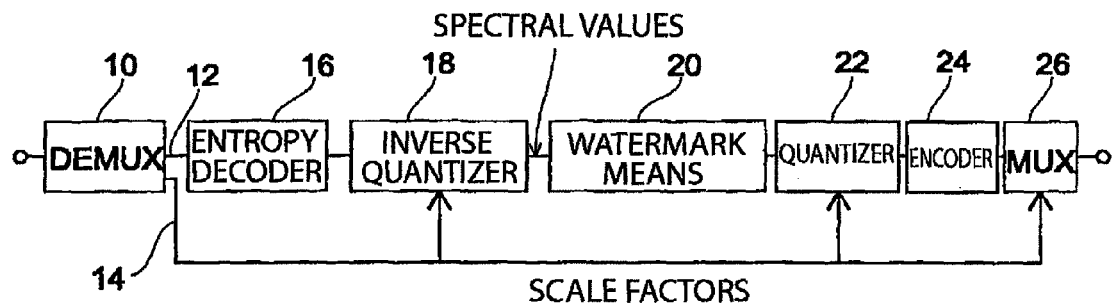
FIG. 1 a block diagram of an inventive apparatus for introducing information into a data stream.

FIG. 1 shows a block diagram of an inventive apparatus or an inventive method for introducing information into a data stream including spectral values representing a short-term spectrum of an audio signal. The data stream applied to the input of a data stream demultiplexer 10 will, if it is processed according to the above-mentioned MPEG AAC standard, generally first be partitioned into spectral values on a line 12 and page information on a line 14, wherein from the side information, the scale factors should be particularly named here. The spectral values that are also entropy encoded after the demultiplexer 10 will then be fed into an entropy decoder 16 and then into an inverse quantizer 18 that generates the spectral values of the audio signal representing the short-term spectrum of the same by using the quantized spectral values and the associated scale factors supplied to the inverse quantizer 18 via line 14. The spectral values will then be fed into watermark means 20 generating sum spectral values including the short-term spectrum of the audio signal and, apart from that, the information to be introduced. These sum spectral values will then, again, be fed into a quantizer 22 and entropy encoded in a following entropy encoder 24 in order to finally be led to a data stream multiplexer 26 which also receives the necessary side information like, for example, the scale factors. Then, at the output of the multiplexer 26, a processed data stream is present which differs from the data stream at the input of the demultiplexer 10 in that it only has one watermark, i.e., that information has been introduced into it.

Figure 2:
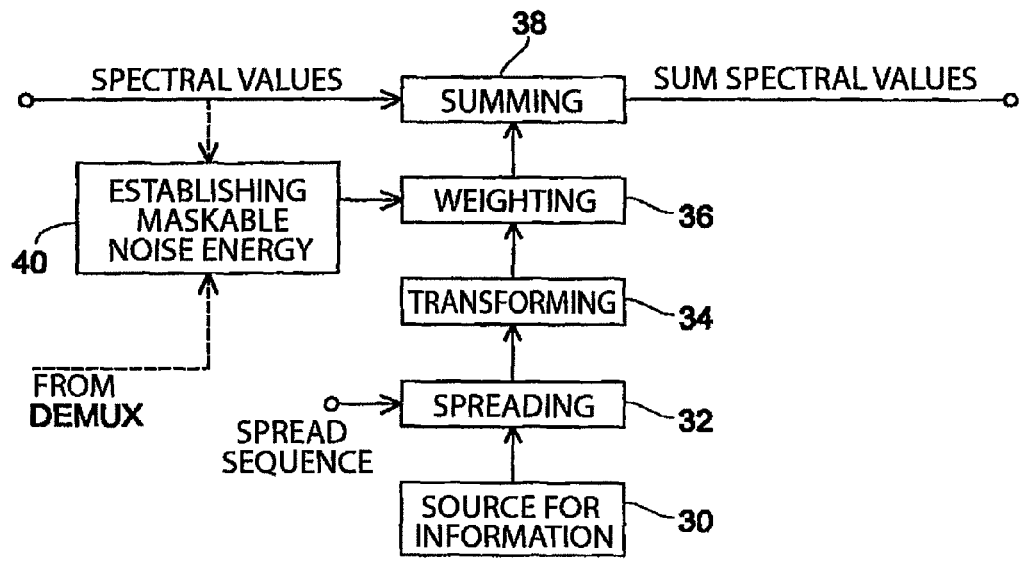
FIG. 2 a detailed block diagram of the watermark means of FIG. 1.

Before a more detailed reference to FIG. 2 including a detailed representation of watermark means 20 is discussed, for ease of understanding, a MPEG-2 AAC audio encoder is referred to as it is, for example, described in appendix B of the standard ISO/IEC 13818-7:1997(E) as informative part. Such an encoder is substantially based on the idea to bring the quantizing noise below the so-called psychoacoustic masking threshold, i.e., to hide it. For the transformation of the audio samples into the frequency domain, i.e., for generating the spectral representation of the audio signal, an analysis filter bank is used which is realised as an critically-under-sampled DCT (DCT=discrete cosine transform) and which has a degree of overlapping of 50%. Its purpose is to create a spectral representation of the input signal that will finally be quantized and encoded. Thus, together with a respective filter bank in the decoder, a synthesis/analysis system is being built.

The psychoacoustic model used in such encoders is based on the psychoacoustic phenomenon of masking. Both frequency area masking effects and time domain masking effects can be modelled that way. The psychoacoustic model provides an estimated value for "noise" energy that can be added to the original audio signal without audible interferences appearing. This maximum admissible energy is referred to as a psychoacoustic masking threshold.

The quantizer 22 and the encoder 24 in FIG. 1 will be described below. Typically, more than one spectral lines will be quantized with the same quantizer step size. Therefore, several adjacent spectral lines will be grouped into so-called scale factor bands. The quantizer optimises the quantizer step size for each scale factor band. The quantizer step size is determined such that the quantizing fault is below or equal to the computed psychoacoustic masking threshold in order to make sure that the quantizing noise is inaudible. It has to be seen that two limits have to be considered and between those, a compromise has to be found. On the one hand, the bit consumption should be kept as low as possible in order to obtain high compression ratios, i.e., a high encoding gain. On the other hand, it has to be made sure that the quantizing noise is below the psychoacoustic masking threshold, so that no interferences are audible in the encoded and redecoded audio signals. Typically, this optimising method is computed in an iterative loop. The result of this loop is a quantizer step size, clearly corresponding to a scale factor for a scale factor band. In other words, the spectral values of the scale factor bands will be quantized with a quantizer step size, which is clearly allocated to the scale factor responsible for the scale factor band. This means that two different scale factors can also lead to two different quantizer step sizes.

The bit stream is composed by a bit stream multiplexer, which mainly fulfils formatting tasks. The data stream that is a bit stream in the case of a binary system, thus comprises the quantized and encoded spectral values or spectral coefficients as well as the scale factors and further side information which are represented and explained in detail in the above-mentioned MPEG-AAC standard.

FIG. 2 shows a detailed block diagram of watermark means 20 of FIG. 1. At a source 30 for information units, information units, preferably in the form of bits, are fed into means 32 for spreading. Means 32 for spreading is basically based on a spread spectrum modulation, which is especially favourable by using a pseudo noise spread sequence for a correlation in the watermark extractor. The information will be combined with the spread sequence bit-by-bit. The combining preferably takes place so that, for an information bit with a logic level of +1, the spread sequence will be generated unchanged at the output of means 32, while for an information bit with a logic level of 0, which can, for example, correspond to a voltage level of −1, the inverse spread sequence is generated at the output of a means 32. Thereby, a "time signal" is generated at the output of means 32, which comprises the spread information from the source 30 for information. This spread information signal will then be transferred into its spectral representation by means 34 for transforming, which can be a FFT algorithm, a MDCT, etc., but also a filter bank. The spectral representation of the spread information signal will be weighed in means 36 in order to then be added to the spectral values in means 38 in such a way that at the output of means 38, the sum spectral values will be present which can then be quantized 22 and encoded 24 with reference to FIG. 1 in order to be fed into the bit stream multiplexer 26. Watermark means 20 further comprises means 40 for establishing the maskable noise energy for the short-term spectrum, which is given through the spectral values.

It has to be noted that means 34 for transforming the spread information signal preferably performs a spectral transformation corresponding to the transformation underlying the data stream at the input of the demultiplexer 10 (FIG. 1). This means that means 34 for transforming preferably performs the same modified discrete cosine transform, which has originally been used for generating the non-processed data stream. This can easily be done, since information like, for example, window type, window shape, window length, etc., are transmitted as side information in the bit stream. This connection is indicated by the broken line in FIG. 2 of the bit stream de-multiplexer 10 (FIG. 1).

As already explained with reference to FIG. 1, after the addition in the summator 38 the sum spectral values will be subjected to quantizing and encoding again. The question occurs here, as to how the quantizer interval, i.e., the quantizer step size which has already been referenced, is to be determined, i.e., whether the iterations have to be performed again or not. Due to the fact that the watermark energy is usually very small compared to the audio signal energy, the same scale factors as in the original bit stream can preferably be used. This is represented in FIG. 1 by the connecting line 14 from de-multiplexer 10 to multiplexer 26. This means that quantizing can be performed much easier by the quantizer 22, since it is no longer necessary (but still possible) to carry out the iteration loop in order to determine an optimum compromise between bit rate and quantizer step size. Instead, the scale factors already known are preferably used.

In the following, the various possibilities for establishing the noise energy maskable by the short-term spectrum will be described which is needed for weighting the spectral representation of the spread information signal. Various possibilities exist which, subsequently, will be discussed with reference to FIG. 3*a*-3*d*.

Figure 3A:
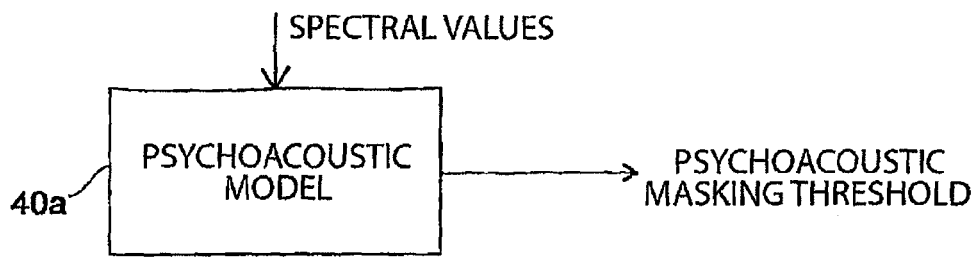
FIG. 3*a* a schematic representation of a method for establishing the maskable noise energy using the psychoacoustic model.

In FIG. 3*a*, a psychoacoustic model is used to compute the psychoacoustic masking threshold of the respective short-term spectrum by using the spectral values of the audio signal. Due to the fact that psychoacoustic models are described in the literature and the standard mentioned, it is only mentioned here that preferably those psychoacoustic models can be used which work with spectral data anyway, or include a time/frequency transformation, respectively. In this case, the psychoacoustic model is simplified compared to the original psychoacoustic model, which underlies every encoder in that the same can be "fed" immediately with spectral values, so that no frequency/time transformation is required in the psychoacoustic model at all. Finally, the psychoacoustic model will output the psychoacoustic masking threshold for the short-term spectrum, such that in block 36 (FIG. 2), the spectrum of the spread information signal can be shaped, such that it has an energy in every scale factor band which is equal to the psychoacoustic masking threshold or below the psychoacoustic masking threshold in this scale factor band. It has to be noted that the psychoacoustic masking threshold is energy. It is desired that the spectral representation of the information signal is as equal to the psychoacoustic masking threshold as possible in order to introduce information into the audio signal through as much energy as possible in order to obtain correlation peaks in an extractor of the watermark that are as good as possible.

The first possibility shown in FIG. 3*a* has the advantage that the psychoacoustic masking threshold can be computed very exactly and that this method is fully compatible with common data streams. The disadvantage is the fact that the computation of a psychoacoustic model can usually be relatively time-consuming, so that it can be said that this possibility is very accurate and interoperable, but does, however, take a lot of time.

Figure 3B:
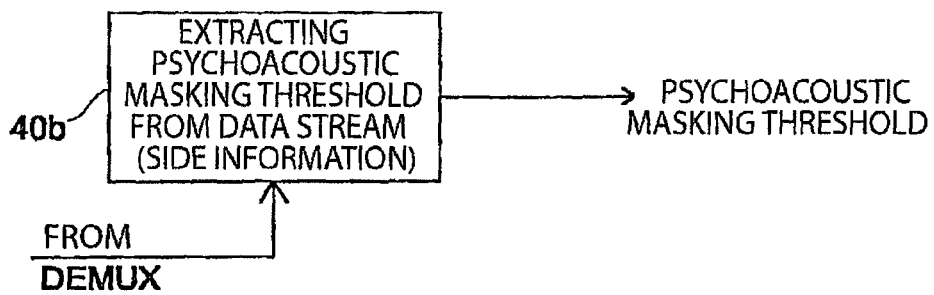
FIG. 3*b* a schematic representation of a method for establishing the maskable noise energy when the psychoacoustic masking threshold is transmitted in the data stream.
Figure 4:
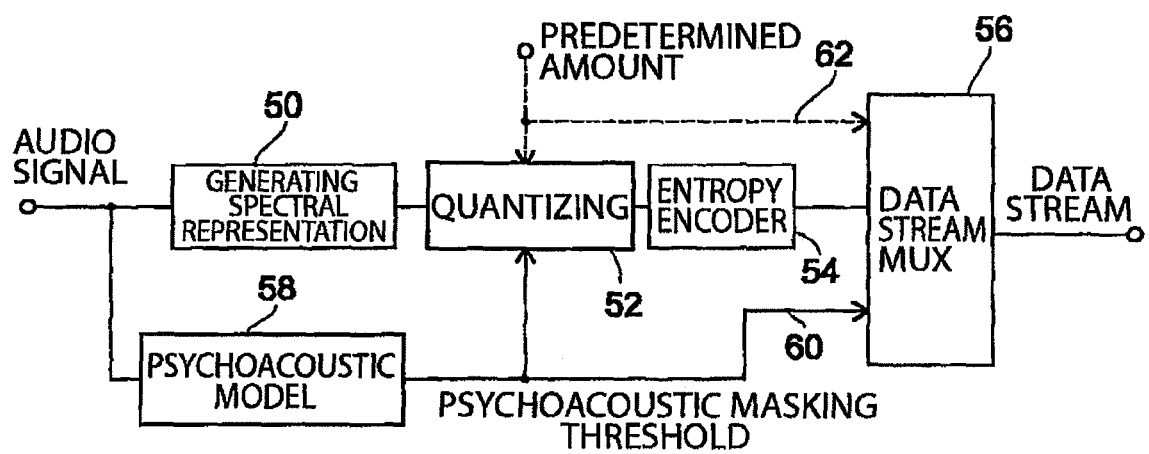
FIG. 4 a block diagram of an inventive audio encoder that either writes the psychoacoustic masking threshold into the data stream or writes the predetermined amount for the method described in FIG. 3*d* into the data stream and whose quantizer is controlled respectively.

Another possibility to obtain the psychoacoustic maskable noise energy shown in FIG. 3*b* consists of writing the psychoacoustic masking threshold for every short-term spectrum into the bit stream in the encoder, that has generated the data stream at the input of the de-multiplexer 10 (FIG. 1) such that the inventive apparatus for introducing information into a data stream merely needs to extract (40*b*) the psychoacoustic masking threshold for each short-term spectrum from the side information of the data stream in order to output the psychoacoustic masking threshold to means 36 for weighting the spectral representation of the spread information signal (FIG. 2). This possibility has the advantage that it is also very exact and, apart from that, very fast, since it only has to be accessed and not computed, but the interoperability is effected, i.e., standard bit streams cannot be provided with a watermark later, since they do not contain psychoacoustic masking thresholds. Therefore an inventive special encoder as described in FIG. 4 is needed here.

Another possibility for establishing the psychoacoustic maskable noise energy is shown in FIG. 3. Here, the psychoacoustic maskable noise energy is computed (40*c*) by using the spectral values and the scale factors. It is assumed that the original encoder that has generated the data stream which has to be introduced into the watermark, has already chosen the noise energy introduced by quantizing, such that it is below the psychoacoustic masking threshold or equal to the psychoacoustic masking threshold, respectively. This method is slightly less exact than the direct computing of the psychoacoustic masking threshold, but in comparison to direct computing of the psychoacoustic masking threshold it is, however, very fast and also maintains the interoperability, i.e., functions also together with standard bit streams.

In the following, it will be addressed as to why the third possibility is a slightly less exact. Several encoding approaches exist which differ, for example, in the quantizer implementations being used. As it has already been described, a quantizer may not exceed the specified bit rate. On the other hand, he has to maintain the psychoacoustic masking threshold. That way, it can happen that a quantizer does not need the available bit rate at all, since, for example, a high bit rate is present or when a piece of music having a very high encoding gain has to be encoded as is the case with tonal pieces, for example. Certain quantizers function so that they quantize finer than necessary and, thus, introduce much less noise energy into the audio signal through quantizing than they would be allowed to. It is, therefore, reasonable that the inventive apparatus as described in FIG. 3*c* assumes that the psychoacoustic masking threshold is much lower than it actually would be allowed to be, which finally leads to the fact that the spectral representation of the spread information signal after weighting has much less energy than it would be allowed to have, whereby not all of the available energy that the watermark is allowed to have, is used. This would, however, not be the case when a quantizer is used which always introduces the maximum allowable noise energy during quantizing and does not write to eventually remaining bits or fills them with any values not taken into consideration during decoding. In this case, the option illustrated in FIG. 3*c* would be exactly the same as the first two possibilities. In the case of the variable quantizer, however, a variable bit rate is created as well. In this case, the watermark means could also be used to make the bit rate constant by filling up bits representing the watermark, so that the constant bit rate is the same as the highest bit rate of the original data stream with variable bit rates.

In the following, it will be addressed how the noise energy which has been introduced by quantizing into a scale factor band will be computed by using the spectral values and the scale factors and above that the characteristic of quantizing.

Here, the following equation for the energy Fxi of the quantizing fault for a spectral value $x_i$ applies.

$$Fxi^2 = (q^{2\alpha}/12\alpha^2) \cdot x_i^{2(1-\alpha)}$$

It has to be noted that this equation applies to irregular quantizers as they are provided, for example, with the standard MPEG-AAC. For regular quantizers, the second term would simply be dropped, when 1 is inserted for $\alpha$.

The factor q appearing in the equation is linked to the quantizer step size QS as follows:

$$q = 2^{QS/4}$$

The factor $\alpha$ is ¾ for the MPEG-AAC quantizer.

The energy of the quantization error in a scale factor band is then the sum of $Fxi^2$ in a scale factor band. This energy has to be smaller than or equal to the psychoacoustic masking threshold in this scale factor band in order to be inaudible. It has to be noted that the psychoacoustic masking threshold in a scale factor band is constant, but takes different values for different scale factor bands. For the energy of the quantization error $x_{min}$, the following value results:

$$xmin = \sum_i [(2^{3/8 \cdot QS})/(27/4) \cdot x_i^{1/2}]$$

The index i is to show that summing always has to be done using the spectral values in the scale factor band, since the psychoacoustic masking threshold is usually given as energy for this scale factor band.

It has to be noted that in the side information of the data stream, the quantizer step sizes for the individual scale factors are not given directly, but, however, according to agreement as specified in the AAC standard, the quantizer step size, which is associated to every scale factors, can be uniquely derived. Apart from that, the characteristic of the quantizer used in the original encoder for generating the data stream has to be known, i.e., if it is an irregular quantizer, its compression factor, which is the factor ¾ in the AAC standard.

Figure 3C:
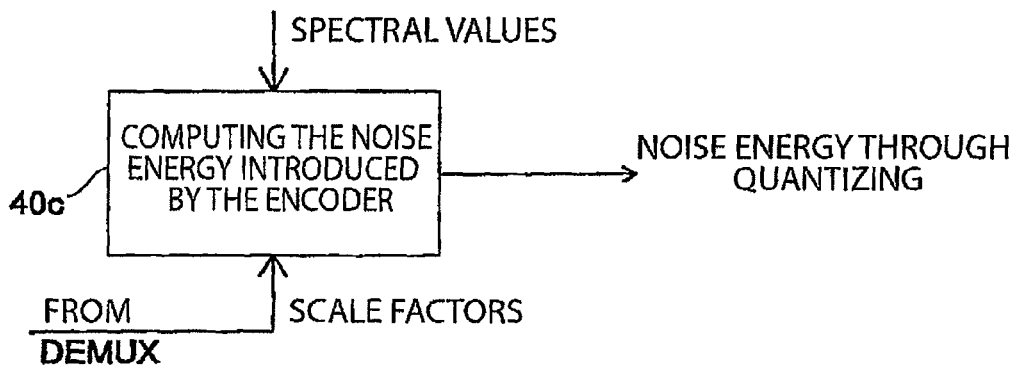
FIG. 3*c* a schematic representation of a method for establishing the maskable noise energy when the noise energy is estimated with the knowledge of the spectral values and the scale factors.

As already discussed, the spectral lines of the spectral representation of the spread information signal will now be weighted so that, together, they have an energy that is smaller than or equal to the psychoacoustic maskable noise energy and, in the case of the option described in FIG. 3c, equal to the noise energy of the quantizing process.

Considering the case that the noise energy introduced by quantizing in the scale factor band is already equal to the psychoacoustic masking threshold and then the same energy is introduced into the audio signal again, but only for the information to be introduced, then it can be seen that all the energy, i.e., the noise energy due to quantizing and the energy for the information can exceed the psychoacoustic masking threshold, which can lead to audible quality losses, which will, however, be small due to the limitation of the energy of information to the psychoacoustic masking threshold, since the psychoacoustic masking threshold will be violated by a factor larger than 1. As already explained, a watermark energy in the order of the psychoacoustic masking threshold will lead to interferences when the quantizing noise is already in the order of the psychoacoustic masking threshold. It is, therefore, preferred to chose the psychoacoustic maskable noise energy which will be weighted such that all the noise energy (quantizing noise plus "noise energy" of information) is smaller than 1.5 times the psychoacoustic masking threshold, wherein even smaller factors up to close to 1.0 are possible. It has to be noted that small factors are also practical, since very high information redundancy has already been introduced due to the spreading of the information signal.

In other words, introducing a watermark into an audio signal whose psychoacoustic masking threshold has already been fully used up by noise energy due to quantizing leads to a lesser deterioration of the audio quality, which will, however, be slightly cancelled by the advantages of the watermark.

In order to overcome this limitation, the concept shown in FIG. 3d can be used, wherein the quantizer in the encoder is controlled from the beginning, such that the noise energy introduced by quantizing is chosen by setting the quantizer step size, such that it always stays below the psychoacoustic masking threshold by a predetermined amount. In other words, an audio encoder for such a concept works such that it quantizes finer than necessary, whereby an "energy potential" for the information to be introduced, i.e., for the watermark, is kept free. This has the advantage that a watermark can be fully introduced without quality loss when, in establishing the psychoacoustic maskable noise energy (40d), which is now smaller than the psychoacoustic masking threshold by a predetermined amount, the predetermined value is considered in means 40d, so that the noise energy due to quantizing and the energy due to the information to be introduced are together equal to or smaller than the psychoacoustic masking threshold. Since the weighted spectral values of the spread information signals are summed with the spectral values of the audio signal, the spectral values of the information signal are, after their weighting, equal to or smaller than the predetermined amount.

This option has the advantage that a watermark can be introduced into a data stream without any quality loss, but that, however, on the one hand, the interoperability suffers and, since the quantizer in the encoder always has to stay below the psychoacoustic masking threshold by the predetermined amount when setting the noise energy by quantizing. On the other hand, this implementation possibility is very efficient, since no psychoacoustic model has to be computed.

In the following, reference is made to FIG. 4 wherein FIG. 4 shows two possibilities for an encoder for audio signals to generate a data stream, which is especially suitable for introducing information according to the invention. Such an audio encoder can, basically, be constructed like a known audio encoder such that it comprises means 50 for generating a spectral representation of the audio signal, a quantizer 52 for quantizing the spectral representation of the audio signal, an entropy encoder 54 for entropy encoding the quantized spectral values and, finally, a data stream multiplexer 56. The data stream output by the data stream multiplexer 56 receives, by an also-known psychoacoustic model 58, the psychoacoustic masking threshold via the data stream multiplexer 56, which is, in contrary to a known audio encoder, written into the data stream, such that the inventive apparatus for introducing information can simply access the psychoacoustic masking threshold in the data stream. The encoder shown in FIG. 4 by a solid line 60 is therefore the counterpart to the apparatus shown in FIG. 1 for introducing information including the option shown in FIG. 3b, as means for establishing maskable noise energy.

Figure 3D:
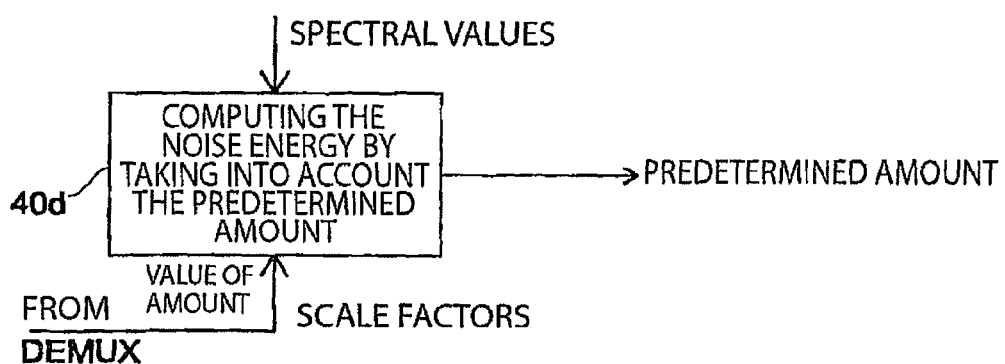
FIG. 3*d* a schematic representation of a method for establishing the psychoacoustic maskable noise energy when energy in the data stream is kept free for the watermark.

The audio encoder means according to the present invention is shown in FIG. 4 in dashed lines corresponding to the option for means 40 shown in FIG. 3d for establishing the maskable noise energy in the inventive apparatus shown in FIG. 1. Here, the quantizer is controlled by a predetermined amount, such that the noise energy introduced by quantizing is below the psychoacoustic masking threshold by the predetermined amount, wherein the value of the predetermined amount is fed into the data stream multiplexer 56 via the dotted line 62 in order to be comprised within the data stream such that the inventive apparatus for introducing information can access the predetermined amount in order to weight respectively (block 36 in FIG. 2).

The invention claimed is:

1. Method for introducing information into a data stream comprising data about spectral values representing a short-term spectrum of an audio signal, the method comprising:
processing the data stream to obtain the spectral values of the short-term spectrum of the audio signal;
combining the information with a spread sequence to obtain a spread information signal;
generating a spectral representation of the spread information signal to obtain a spectral spread information signal;
establishing psychoacoustic maskable noise energy as a function of frequency for the short-term spectrum of the audio signal, the psychoacoustic maskable noise energy being variable over frequency, wherein the psychoacoustic maskable noise energy is smaller or the same as the psychoacoustic masking threshold of the short-term spectrum;
weighting the spectral spread information signal by using the established psychoacoustic maskable noise energy being varying over frequency to generate a weighted information signal, wherein the energy of the introduced information is varying over frequency and is substantially equal to or below the psychoacoustic masking threshold;
summing the weighted information signal with the spectral values of the short-term spectrum of the audio signal to obtain sum spectral values comprising the short-term spectrum of the audio signal and the information; and
processing the sum spectral values to obtain a processed data stream comprising the data about the spectral values of the short-term spectrum of the audio signal and the information to be introduced,
wherein the processing the data stream, the combining, the generating, the establishing, the weighting, processing the sum spectral values or the summing is performed using a processor
wherein the spectral values of the data stream are quantized such that the noise energy introduced by quantizing is smaller than the psychoacoustic masking threshold by a predetermined amount and wherein, in the step of establishing an energy corresponding to the predetermined amount is established: and
wherein in the step of weighting the spectral values of the spectral representation of the spread information signal are set such that they have an energy corresponding to the predetermined amount.

2. Method according to claim 1, wherein the data stream comprises quantized spectral values as data about spectral values, the step of processing the data stream comprising the following sub-step:
inverse quantizing the quantized spectral values to obtain the spectral values; and
with the step of processing the summed spectral values comprising:
quantizing the summed spectral values to obtain quantized summed spectral values; and
forming the processed data stream using the quantized summed spectral values.

3. Method according to claim 2 wherein the quantized spectral values in the data stream are entropy-encoded, with the step of processing the data stream comprising the following sub-step:

entropy-decoding the entropy-encoded spectral values to obtain the quantized spectral values; and
the step of processing the summed spectral values comprising:
entropy-encoding the quantized summed spectral values.

4. Method according to claim 1, wherein the step of establishing the psychoacoustic maskable noise energy comprises:
computing the psychoacoustic masking threshold as a function of frequency using a psychoacoustic model, which is based on the spectral values of the audio signal.

5. Method according to claim 1, wherein the data stream further comprises side information comprising scale factors by which the spectral values will be multiplied in groups in an audio encoder prior to quantizing, the step of processing the data stream further comprising the following sub-step:
extracting the scale factors from the data stream; and
the step of establishing comprising:
computing the noise energy introduced into the audio encoder when quantizing as a function of frequency by using the scale factors for the short-term spectrum and by using the spectral values as well as knowing a quantizer used in the audio encoder, the introduced noise energy being a measure for the psychoacoustic maskable noise energy used in weighting.

6. Method according to claim 1, wherein in the step of processing the sum spectral values, the same quantizing step sizes as in the original data stream are used.

7. Method for encoding an audio signal, comprising:
generating a short-term spectrum of the audio signal comprising a plurality of spectral values;
computing the psychoacoustic masking threshold of the audio signal using a psychoacoustic model;
quantizing the spectral values considering the psychoacoustic masking threshold, so that the noise energy introduced by quantizing is smaller than the psychoacoustic masking threshold by a predetermined amount; and
forming a bit stream comprising values corresponding to the quantized spectral values of the short-term spectrum, wherein an indication for the value of the predetermined amount is included in the bit stream,
wherein the generating, the computing, the quantizing or the forming of the bit stream is performed using a processor.

8. Apparatus for introducing information into a data stream comprising data about spectral values representing a short-term spectrum of an audio signal, the apparatus comprising:
a processor for processing the data stream to obtain the spectral values of the short-term spectrum of the audio signal;
a combiner for combining the information with a spread sequence to obtain a spread information signal;
a generator for generating a spectral representation of the spread information signal to obtain a spectral spread information signal;
an establisher for establishing psychoacoustic maskable noise energy as a function of frequency for the short-term spectrum of the audio signal, the psychoacoustic maskable noise energy being variable over frequency, wherein the psychoacoustic maskable noise energy is smaller than or the same as the psychoacoustic masking threshold of the short-term spectrum;
a weighter for weighting the spectral spread information signal by using the established psychoacoustic maskable noise energy being varying over frequency to generate a weighted information signal, wherein the energy of the introduced information is varying over frequency and is substantially equal to or below the psychoacoustic masking threshold;

a summer for summing the weighted information signal with the spectral values of the short-term spectrum of the audio signal to obtain spectral values comprising the short-term spectrum of the audio signal and the information; and another processor for processing the summed spectral values to obtain a processed data stream comprising the data about the spectral values of the short-term spectrum of the audio signal and the information to be introduced, wherein the spectral values of the data stream are quantized such that the noise energy introduced by quantizing is smaller than the psychoacoustic masking threshold by a predetermined amount and wherein, in the step of establishing an energy corresponding to the predetermined amount is established, and wherein the weighter is configured to set the spectral values of the spectral representation of the spread information signal such that they have an energy corresponding to the predetermined amount.

9. Apparatus for encoding an audio signal, comprising:
a generator for generating a short-term spectrum of the audio signal comprising a plurality of spectral values;
a calculator for computing a psychoacoustic masking threshold of the audio signal using a psychoacoustic model;
a quantizer for quantizing spectral values considering the psychoacoustic masking threshold so that noise energy introduced by quantizing is smaller than the psychoacoustic masking threshold by a predetermined amount;
a bitstream formatter for forming a bit stream comprising values corresponding to the quantized spectral values of the short-term spectrum, wherein an indication for the value of the predetermined amount is included in the bit stream,
wherein the generator, the calculator, the quantizer or the bit stream formatter comprises a processor.

* * * * *